United States Patent Office 3,284,165
Patented Nov. 8, 1966

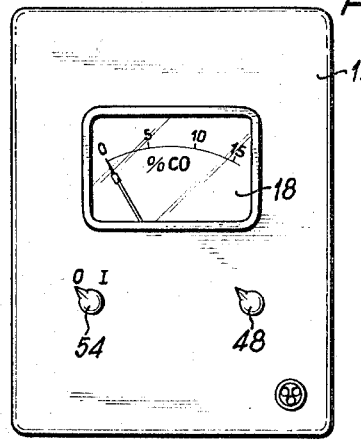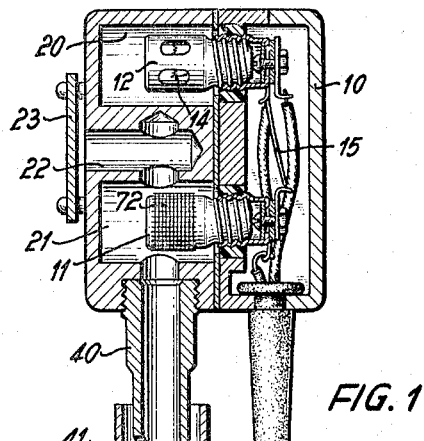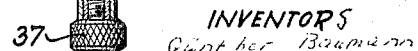

3,284,165
ELECTRICAL MEASURING DEVICE FOR THE ANALYSIS OF EXHAUST GASES OF INTERNAL COMBUSTION ENGINES
Günther Baumann and Hermann Scholl, Stuttgart, Wolfgang Reichardt, Stuttgart-Rohr, Hans Zeller, Doffingen, Wurttemberg, and Josef Wahl, Stuttgart-Kaltental, Germany, assignors to Robert Bosch G.m.b.H., Stuttgart, Germany
Filed Sept. 11, 1964, Ser. No. 395,760
Claims priority, application Germany, Sept. 12, 1963, B 73,481
3 Claims. (Cl. 23—255)

The present invention concerns an electrical analyzer of exhaust gases of an internal combustion engine. It is possible to carry out such an analysis by introducing the exhaust gases together with some additional air or oxygen into a combustion chamber wherein the non-combusted combustible components of the exhaust gases are catalytically combusted along the surface of a measuring wire which is kept at glow temperature and which constitutes one branch of an electrical resistance bridge which contains, in another branch thereof, a reference resistance wire.

It is on object of this invention to provide for an electrical analyzer for automatically carrying out an analysis as described above and which operates continuously and furnishes a direct indication of the proportion between combustible components and non-combustible components contained in such exhaust gases, and particularly the proportional content of carbon monoxide in the exhaust gases.

It is another object of the invention to provide for an apparatus of the type set forth which makes it possible to check particularly gasoline engines both while idling and while operating in the lower load range in order to find out whether the fuel-air mixture is correctly and properly combusted, so that if necessary the carburetor of the engine can be adjusted rapidly and reliably.

It is therefore still another object of the invention to provide for an apparatus as set forth which operates with a rather small delay between the moment of making a particular test and the moment of the resulting indication, this delay being intended to amount to not more than about 5 seconds.

It is a further object of the invention to provide for an arrangement of the kind mentioned above which is comparatively simple in its structure and practical in its application by furnishing a visual indication of unequivocal clarity directly to the operator who adjusts the carburetor, no matter where the actual test of the exhaust gases emanating from the particular engine are carried out.

With above objects in view the invention includes an electrical analyzer of exhaust gases of an internal combustion engine, comprising, in combination, measuring head means comprising two separate compartments, tubular conduit means secured at one end to said measuring head means communicating with one of said compartments therein, said tubular conduit means being adapted to be inserted at its other end into the exhaust pipe of an internal combustion engine and to cause exhaust gases therefore to stream into and through said one compartment; first resistor means including a measuring resistor arranged in said one compartment and adapted to be heated by passage of an electric current so as to assume a predetermined resistance and temperature and thereby to ignite combustible components contained in said exhaust gases entering said one compartment, the burning of such combustible components in turn additionally heating said measuring resistor and thereby changing said predetermined resistance; second resistor means including a reference resistor arranged in the other one of said compartments and adapted to be heated by electric current passing therethrough so as to assume a substantially constant reference resistance; and electric circuit means entering at one end thereof said measuring head means and being connected on one hand with said measuring resistor in said one compartment and on the other hand with said reference resistor in said other compartment, said electric circuit means being adapted to be connected at the other end thereof with an electric measuring instrument adapted to measure and to indicate a change of resistance of said measuring resistor relative to the substantially constant resistance of said reference resistor during passage of said exhaust gases through said one compartment, such change of resistance being an indication of the proportion between combustible components and non-combustible components in said exhaust gases.

It should be understood that in an arrangement as defined above, the arrangement may be advantageously such that the non-combusted combustible components of the exhaust gases are conveyed with small pressure in excess of the atmospheric pressure to a mixing chamber or nozzle where air for combustion is introduced into the exhaust gases whereafter the latter are introduced into the compartment of the measuring head which contains the measuring resistor. The measuring resistor, preferably a platinum wire, is kept at glow temperature by electric current passing therethrough so that the combustible components of the exhaust gases are ignited and thereby increase the temperature of this measuring resistor. As the concentration of non-combusted combustible components increases, the additional rise of temperature produced by their combustion increases. Consequently, the resistance of the measuring wire increases relative to the resistance of the reference wire which is preferably of the same material and characteristic and heated by the same electric current in the same manner as the measuring wire. If, now, the measuring resistor and the reference resistor are components of a resistance bridge which has been adjusted to balanced condition before the start of the test, then the change of resistance in the measuring resistor can be indicated by a current measuring device arranged in the diagonal of the bridge circuit. This current measuring instrument may be a standard milliammeter which, if it has been calibrated before the start of the test to zero indication, will indicate by the deflection of its pointer directly the concentration of non-combusted combustible components of the exhaust gases because a change of this concentration is linearly proportional to the deflection of the pointer of the current measuring instrument.

Predominantly, the incompletely combusted components of the exhaust gases consist of carbon monoxide. Hydrocarbons may also be present, but in a much weaker concentration. Since the concentration of hydrocarbons increases and decreases approximately in proportion with that of the carbon monoxide it is possible to take into consideration their influence during the catalytic combustion when the indicating instrument is calibrated so that the milliammeter can be graduated directly in terms of volume-percents of CO.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a diagrammatic illustration of a measuring head according to the invention together with the pertaining conduit means, to the maximum extent in axial cross section;

FIG. 2 is an elevation of an electrical measuring and indicating instrument that may be used in conjunction with the arrangement according to FIG. 1; and FIG. 3 is a schematic circuit diagram of the electrical components of the measuring instrument including the electrical components of the measuring head.

Referring to FIG. 1, it can be seen that the electrical analyzer according to the invention comprises a measuring head 10 which contains two compartments 20 and 21. Within each of these compartments a threaded insert is located and received in a pertaining threaded socket in a manner similar to that known of an electric bulb or fuse. The insert 11 in the compartment 21 contains the measuring wire 13 mentioned further below but not shown in FIG. 1 while the insert 12 in the compartment 20 contians the reference resistor or wire 14, as shown. Both the measuring resistor 13 and the reference resistor 14 are each constituted by a platinum wire which preferably have both the same dimensions and characteristics. The measuring wire 13 and the reference wire 14 constitute each a branch of a resistance bridge circuit which is illustrated in greater detail in FIG. 3. The two resistor wires are connected with each other by a conductor 15 and can be connected by leads 16, 16′ and 16″, preferably constituting together a cable connection 17, with an electrical current measuring instrument 18 and with the remaining portions of the above-mentioned bridge circuit, all these other elements including the indicating instrument being assembled in an instrument housing 19 illustrated by FIG. 2.

The compartment 20 which contains the insert 12 with the reference wire 14 is closed all around and particularly sealed against the other compartment 21 which contains the insert 11 with the measuring wire 13. The compartment 21 communicates the surrounding air by an exit channel 22 which is preferably protected against the influence of wind blasts by a cover plate 23 spaced somewhat from the opposite wall of the head 10. The compartment 21 further communicates with a conduit system which serves to introduce exhaust gases which are to be tested into the compartment 21. This conduit system may comprise first of all a brass tubing 30 which is connected at right angles with a second tubing 31 and may be attached to the exhaust pipe 33 of an engine by means of a clamping device 35 and a clamping screw 34 as illustrated. The tubing 31 carries a number of cooling ribs 36 and terminates in a narrow nozzle 38, which is surrounded by a tubular support member 40 having a lateral opening 41 approximately level with the forward opening of the nozzle 38. The tubular member 40 is, in turn, surrounded by a protective tubular shell 39 leaving free access of air to the interior of the member 40. When the engine to be tested is in operation, the exhaust gases will be expelled through the exhaust pipe 33 and a portion thereof will be forced into the tubing 30 and will be conveyed through the tubing 31 and the nozzle 38 toward the compartment 21, together with some air introduced by this operation through the lateral opening 41. As will be seen from the description further below the leads 16′ and 16″ connected with the outer ends of the resistance wires 13 and 14 serve for passing a current through these resistors in order to heat the wires up to a predetermined temperature which keeps the wires at low red glow.

As mentioned above, the two platinum wires or resistors 13 and 14 having at normal operating temperature substantially the identical resistance are parts or branches of a Wheatstone bridge which of course has to be adjusted before the start of a test in such a manner that the milliammeter 18 is in zero indicating position as illustrated. As shown by FIG. 3, the bridge circuit comprises two other branches namely a resistor 45 of about 30 ohms and another resistor 46 of about 36 ohms, the latter resistor 46 being connected in parallel with a series combination of a protective resistor 47 of about 100 ohms and an adjustable resistor 49 which may be controlled by the control button 48 shown in FIG. 2. The adjustable resistor 49 may be operated for balancing the bridge circuit before the start of a test so as to set the instrument 18 to zero. In addition, in the diagonal 16 of the bridge circuit a variable resistor 50 is connected in series with the indicating instrument 18 whereby it is possible to calibrate the latter in such a manner that it indicates directly volume-percent CO existing in the exhaust gases passing through the compartment 21.

In addition in a preferred embodiment of the invention, the housing 19 of the indicating instrument contains a regulating circuit which is equipped with three transistors and is designed for causing the bridge circuit and the resistors 13 and 14 to be supplied with a constant or at least substantially constant operating voltage of e.g. 3 volts even if the source of electric energy e.g. the storage battery of a motor vehicle connected with the input terminals 52 and 53 should furnish a greatly varying voltage that may range between 5 and 15 volts.

It can be seen that immediately adjacent to the positive input terminal 52 a main switch 54 is provided to which is connected the common positive supply line 55 of the circuit arrangement. In order to insure the arrangement against application of electric energy with wrong polarity which would interfere with the operation of the regulator circuit and of the bridge circuit, the common negative supply line 56 of this circuit arrangement is provided with a rectifier 57 adjacent to the negative input terminal 53. A capacitor 58 of about 250 μf. is connected between the lines 55 and 56 as shown. In parallel therewith a series combination comprising the emitter-collector circuit of a control transistor 60 and of a load resistor 61 of about 2000 ohms is connected. The junction point between the collector of the control transistor 60 and the resistor 61 is connected to the base of a second control or driver transistor 62, the emitter-collector circuit whereof is connected in parallel with the collector base circuit of a load-carrying transistor 63. The emitter-collector circuit of the transistor 63 is connected between the line 56 and one corner point of the bridge circuit and serves as a variable resistor for the operating current which flows from the above-mentioned corner of the resistance bridge to the negative input terminal 53 and thus determines the value of the potential that may exist between the positive line 55 and the emitter of this transistor 63. This potential is kept at a substantially constant value by means of a series-combination composed of a Zener diode 65 and a supplementary resistor 66 connected as shown because the junction point between the resistor 66 and the Zener diode 65 is connected to the base of the first control transistor 60 and because the Zener diode 65 has a critical threshold voltage of about 3 volts. In addition to this backward-acting regulation also a forward-acting regulation is provided by providing a resistor 67 connected between the base of the control transistor 60 and the negative line 56, this additional means of regulation operate in such a manner that it responds to the value of the output voltage of the storage battery appearing at the terminals 52, 53 and rendering the control transistor 60 the more conductive and consequently the load-carrying transistor 63 the more non-conductive, the higher is the output voltage of the battery. Consequently the current passing resistance of the load-carrying transistor 63 is greatly reduced when the output voltage of the battery available at the terminals 52, 53 approaches the lower limit of 5 volts. In order to further reduce the output voltage of the regulating arrangement acting on the resistance bridge three germanium semiconductors 70 are connected in the circuit portion which connects the above-mentioned supplementary resistor 45 of the bridge, or the measuring resistor 13, with the emitter of the load-carrying transistor 63. The conventional germanium semiconductors 70 have within their range of conductivity a current-voltage characteristic which displays at an input voltage of about .3 to .4 volt a distinct break. Since the semiconductors 70 are connected in series with each other they will produce a voltage drop of about 1 volt irrespective of the magnitude of the current flowing through the bridge circuit.

In view of the fact that the operating voltage of the arrangement is kept substantially constant at 3 volts by means of the above described regulating arrangement and since this substantially constant voltage is applied to both the resistors 45 and 46, the platinum wires 13 and 14 having a predetermined resistance of 5 ohms will be heated only to a low red glow which is sufficient for causing catalytically ignition or combustion of the combustible components existing in the exhaust gases passing through the compartment 21, while at the same time under these conditions a long life of the platinum wires is guaranteed. By the combustion of the combustible components of the exhaust gases along the surface of the measuring wire 13 the temperature of the latter is raised whereby also the electrical resistance thereof is increased with the result that a balancing current will flow in the bridge circuit through the diagonal thereof containing the current measuring instrument 18 and the variable resistor 50. This current will be the greater the higher is the concentration of the combustible components in the exhaust gases which are combusted along the measuring wire 13.

It has been found to be particularly advantageous for the above-described measuring and analyzing arrangement if the platinum wire 13 is protected against an influence of the stream of exhaust gases which are conveyed by the conduit arrangement 30, 31, 40 into the compartment 21 and leave the latter through the outlet 22. In fact, this stream of exhaust gases, particularly if the speed of the engine being tested is increased beyond idling speed, can easily affect the accuracy of the analysis due to a cooling effect on the platinum wire 13. In order to prevent this difficulty the insert 11 is provided with a protective shell 72 which is permeable for the gases and which may consist for instance of blotting paper or of fine-mesh wire cloth. In this case the combustible components of the exhaust gases pass by diffusion through this protective shell and reach the wire while the latter is protected against the stream of the exhaust gases and is therefore prevented from furnishing an indication which depends on the speed of the engine tested.

In order to protect the milliammeter 18 against overload which might occur in the case of breakdown of one of the two resistors 13 and 14, he series connection consisting in the diagonal of the bridge circuit of the instrument 18 and the resistor 50 is supplemented by a first semiconductor rectifier 73 connected in parallel therewith and permitting flow of current in one direction, and a second semiconductor rectifier 74 permitting flow of current in the opposite direction and also connected in parallel with said series combination. These conventional rectifiers should be chosen to have a diffusion potential or threshold potential of about .4 volt so that the voltage drop appearing and permissible across the milliammeter is limited to this value.

In practice it has been found that it is a particular advantage of the arrangement of the invention as described above that during the tests of the engine and the necessary adjustment of the carburetor thereof, resulting in corresponding changes of the effectiveness of the combustion process in the engine, the corresponding indications furnished by the analyzer according to the invention are subjet only to a very short delay amounting to about 4 seconds of whch about 2 seconds are required for the engine to change its performance while the other 2 seconds are required for the analyzer to carry out its operation. Consequently the adjusting operation of the engine aiming at obtaining an optimal combustion therein is greatly facilitated and accelerated particularly because the instrument 18 can be provided with a dial and can be calibrated so as to indicate directly volume-percent CO contained in the exhaust gases. In addition, the entire arrangement is such that the measuring head and conduit arrangement illustrated by FIG. 1 may be attached to the exhaust pipe, i.e., at the rear end of the automobile while the indicating instrument 19 connected therewith by the cable 17 can be conveniently positioned in front of the operator who will normally adjust the carburetor of the engine located in the front portion of the car. Of course, the housing 19 of the indicating instrument according to FIG. 2 would have two input terminals not shown in FIG. 2 but indicated by FIG. 3 which can be easily connected with the storage battery of the vehicle. Under these circumstances the job of adjusting an internal combustion engine of a motor vehicle is extremely simplified and facilitated.

It will be understood that each of the elements described above, or two or more together, may also find a useful application in other types of an electrical analyzer of exhaust gases of an internal combustion engine, differing from the types described above.

While the invention has been illustrated and described as embodied in an electrical analyzer of exhaust gases of an internal combustion engine comprising a bridge circuit in which a measuring wire and a reference wire constitute two bridge branches, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electrical analyzer of exhaust gases of an internal combustion engine, comprising, in combination, measuring head means comprising two separate compartments;

tubular conduit means secured at one end to said measuring head means communicating with one of said compartments therein, said tubular conduit means being inserted at its other end into the exhaust pipe of an internal combustion engine and causing exhaust gases therefrom to stream into and through said one compartment;

first resistor means including a measuring resistor comprising a platinum wire positioned in said one compartment and heated by passage of an electric current therethrough so as to assume a predetermined resistance and temperature and thereby to ignite combustible components of said exhaust gases entering said one compartment, the burning of such combustible components in turn additionally heating said measuring resistor and thereby changing the predetermined resistance thereof;

second resistor means including a reference resistor constituted by a platinum wire positioned in the other of said compartments and heated by electric current passing therethrough to assume a substantially constant reference resistance;

a source of electric energy for supplying electrical energy, said source having two terminals of opposite polarity; and electric circuit means including a bridge circuit comprising a multi-lead connection entering at one end thereof said measuring head means and connecting said measuring resistor in said one compartment and said reference resistor in said other compartment as two branches of said bridge circuit, said electric circuit means comprising at least two supplementary resistors connected in two other branches of said bridge circuit, an electric current measuring instrument connected as a diagonal of said bridge circuit, said multi-lead connection connecting said measuring and reference resistors with the remainder of said bridge circuit, said electric measuring instrument being connected in said bridge circuit in a manner whereby it measures and indicates a change of resistance of said measuring resistor relative to the substantially constant resistance of said reference resistor during passage of said exhaust gases through said one compartment, such change of resistance being an indication of the proportion between combustible components and non-combustible components of said exhaust gases, and automatic regulating means connected between said bridge circuit and said source of electric energy for keeping the voltage applied to said measuring and reference resistors from said source of electric energy substantially constant when the output voltage of said source varies considerably, said regulating means comprising a load-carrying transistor having an emitter electrode, a collector-base circuit and an emitter-collector circuit connected between one terminal of said source and a point between adjacent branches of said bridge circuit, a first additional resistor, a first control transistor having a base electrode and an emitter-collector circuit connected in series with said first additional resistor across the two terminals of said source, a second control transistor having an emitter-collector circuit connected in series with the collector-base circuit of said load-carrying transistor, said second control transistor having a base electrode connected to a point between the emitter-collector circuit of said first control transistor and said first additional resistor thereby controlling the conductivity of said load-carrying transistor and thereby causing a regulated voltage to be applied to said bridge circuit, and a voltage divider connected between the other terminal of said source and the emitter electrode of said load-carrying transistor.

2. An electrical analyzer as claimed in claim 1, wherein said voltage divider comprises a second additional resistor and a Zener diode connected in series and means connecting a point between said second additional resistor and said Zener diode to the base electrode of said first control transistor for applying thereto a predetermined portion of said regulated voltage.

3. An electrical analyzer as claimed in claim 2, wherein each of said second control transistor and said load-carrying transistor has a collector electrode and wherein said electric circuit means further comprises a third additional resistor connected between the base electrode of said first control transistor and the collector electrodes of each of said second control transistor and said load-carrying transistor.

References Cited by the Examiner
UNITED STATES PATENTS

| Re. 20,041 | 7/1936 | Stein | 23—232 |
|---|---|---|---|
| 1,957,341 | 5/1934 | Holt | 23—255 |
| 2,393,220 | 1/1946 | Jacobson et al. | 23—255 |
| 2,981,888 | 4/1961 | White | 324—110 X |

FOREIGN PATENTS 1,308,844  10/1962  France.

MORRIS O. WOLK, *Primary Examiner.*

JOSEPH SCOVRONEK, *Examiner.*